May 5, 1931.  H. E. DUDYCHA  1,803,604
RENDERING TANK
Filed Feb. 26, 1927  2 Sheets-Sheet 2
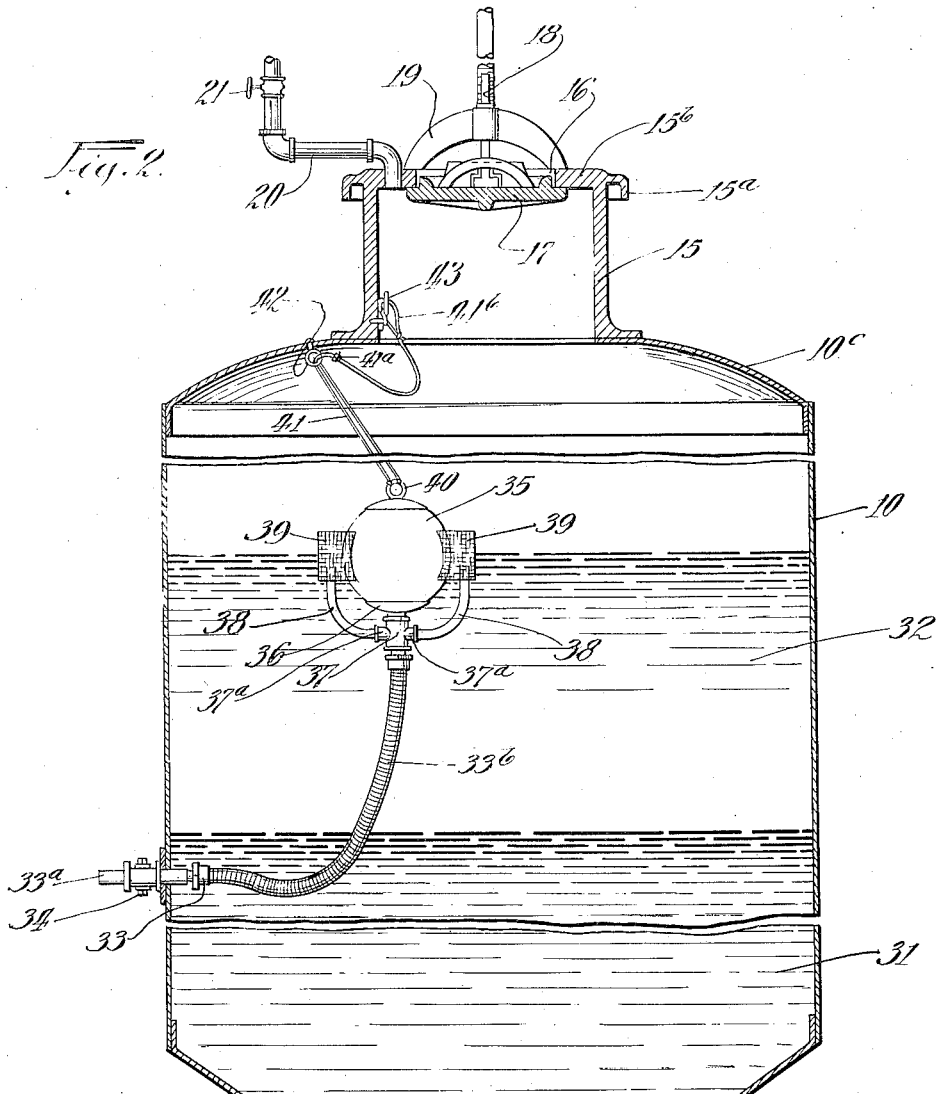
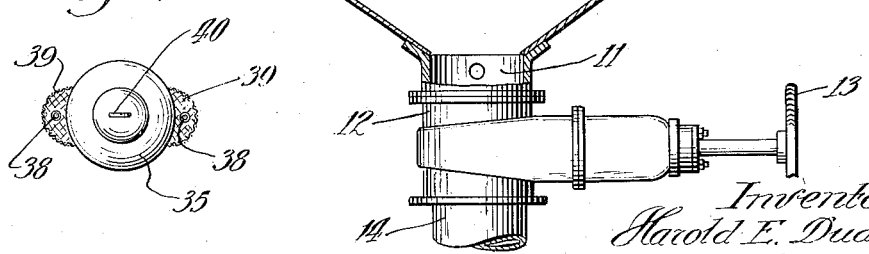
Inventor:
Harold E. Dudycha,
By Rector, Hibben, Davis &
Macauley, Attys.

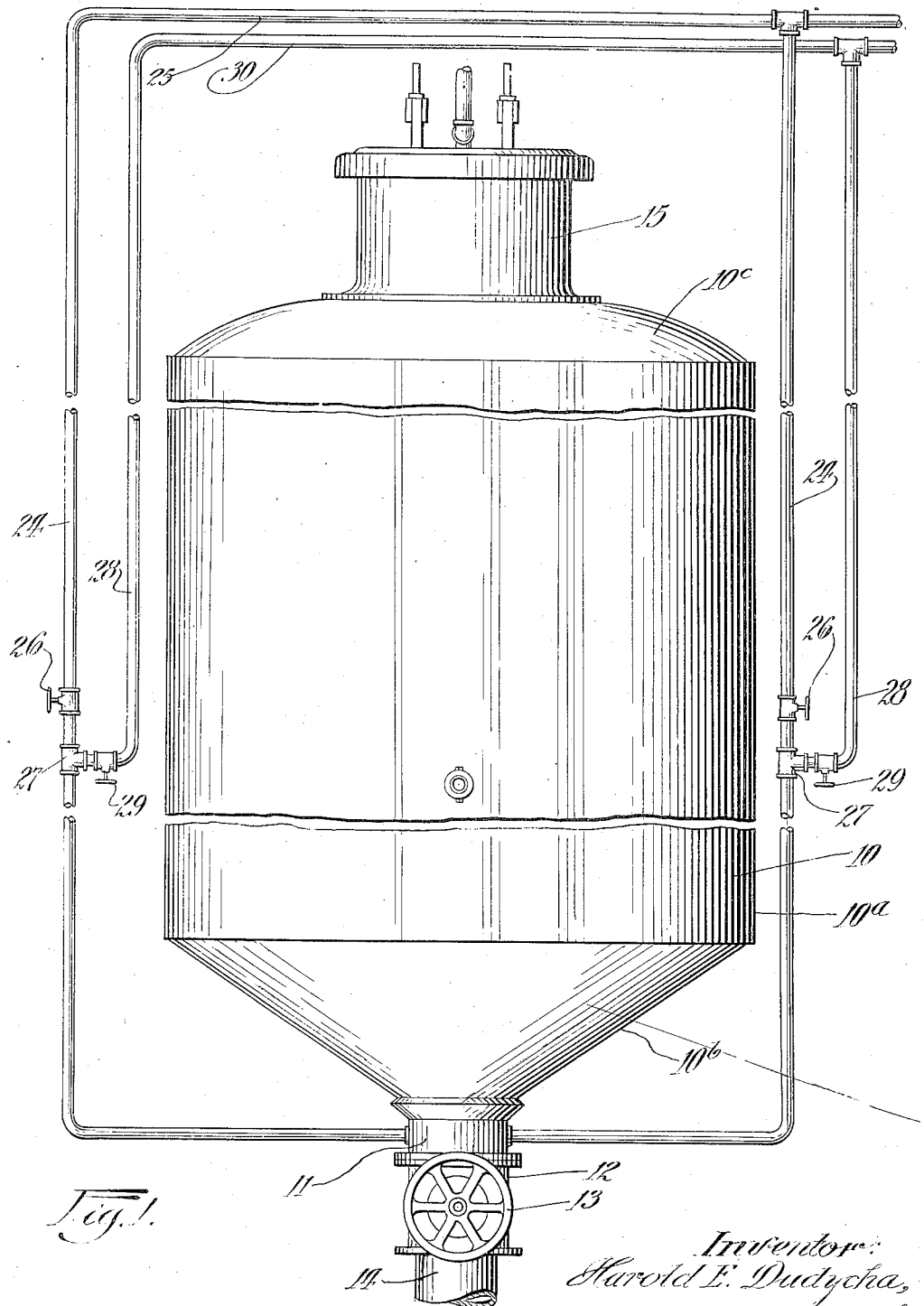

Patented May 5, 1931

1,803,604

UNITED STATES PATENT OFFICE

HAROLD E. DUDYCHA, OF SOUTH ST. PAUL, MINNESOTA, ASSIGNOR TO SWIFT & COMPANY, OF CHICAGO, ILLINOIS, A CORPORATION OF ILLINOIS

RENDERING TANK

Application filed February 26, 1927. Serial No. 171,111.

This invention relates to improvements in methods of and means for rendering lard and its purpose is to provide an improvement whereby the quality of the lard rendered is improved and the time and necessary equipment for carrying on the rendering process are decreased.

The principal object of the invention is to provide an improved method of rendering lard according to which the rendered lard is withdrawn from the surface of the liquid within the rendering vessel. A further object is to provide improved means for permitting the withdrawal of the lard from the surface of the liquid in the rendering or settling vessel throughout the withdrawal process while eliminating the danger of mixing water with the lard. A further object is to provide an improved method and means whereby the time of carrying on the complete rendering process is greatly reduced. A further object is to provide an improved method of withdrawing lard by which the quality and color of the lard are greatly improved as compared with methods heretofore practiced. Other objects relate to various features of the method and apparatus which will appear more fully hereinafter.

Heretofore, it has been the practice in rendering lard to place the scraps of fat and the like to be rendered in a vessel with water and to heat the mixture by the introduction of steam until, after a suitable period of cooking, the lard has been thoroughly rendered from the residue, after which the mixture has been allowed to settle to permit the residue and water to descend out of the lard. The practice has been, then, to draw off the lard by providing an outlet adjacent the bottom of the layer of lard carried above the water and residue mixture and, on some occasions, it has been the practice to raise the level of the lard gradually during the withdrawal process by introducing additional water into the bottom of the chamber in order to maintain the layer of lard at the level of the outlet, thus requiring a considerable storage capacity in water tanks and the like in order to permit the necessary raising of the level. In order to permit the withdrawal of the lard from the lower part of the lard layer, according to the old practice, it has been necessary to allow the settling step of the process to continue for a sufficient length of time to render all portions of the lard layer substantially free of water globules and floating particles of the meat scrap residue. As a result of that procedure, the top portions of the lard layer have usually been allowed to remain in the tank for a longer period than is desirable, with the result that the lard acquires a yellowish or reddish color instead of the desired greenish color which is characteristic of the highest grade of lard. The difficulty arising from this discoloration has been particularly apparent where the lard has been rendered from so-called "killing fat", that is, scraps of fat which are accumulated on the killing floor of the packing house during the process of slaughtering the animals. Even when the lard has been rendered from so-called "cutting fat", that is, raw fat accumulated in the process of trimming the clean and cooled carcasses, preliminary to storage, there has been great difficulty arising from the discoloration of the lard because of the long time required to effect a sufficient settling thereof preliminary to drawing it from the tank. These difficulties are overcome in the present invention by providing a method which permits the withdrawal of the rendered lard before discoloration and which provides a desirable greenish color in the product even when the lard is rendered from killing fat.

The nature of the invention will be more fully understood from the following specification taken with the accompanying drawings in which there is illustrated one form of the improved apparatus which is preferably employed in carrying on the improved method. In the drawings, Fig. 1 shows a side elevation of the improved apparatus, with parts thereof broken away; Fig. 2 shows a vertical section, taken at right angles to the view of Fig. 1, illustrating the construction of the interior of the rendering vessel; and Fig. 3 shows a top plan view of the outlet carrying float.

The improved apparatus illustrated in the accompanying drawings comprises a rendering tank 10 having a cylindrical outer wall 10ª connected at its lower end with the conical bottom wall 10ᵇ. The extremity of the bottom wall 10ᵇ communicates with an outlet conduit 11 which is connected with the casing of a gate valve 12 having an operating handle 13 which may be manipulated to open the valve and permit the contents of the tank to discharge through the discharge conduit 14. The cylindrical wall 10ª of the tank is connected at its upper end with the somewhat dome-shaped top wall 10ᶜ having an opening in the upper central part thereof to communicate with the head 15 through which the materials to be rendered are introduced into the tank. The head 15 has an outer annular flange 15ª formed around the edge of the top wall 15ᵇ. This top wall has an opening 16 formed therein through which the materials are introduced and this opening is adapted to be closed by the cover plate 17 which is adjustable vertically by means of a screw 18 engaging the yoke 19 which extends transversely across the top wall of the head, as shown in Fig. 2. A blow-off pipe 20 leads into the head 15 through the top wall 15ᵇ thereof and a valve 21 is connected in this blow-off pipe to control the opening thereof.

Steam is introduced into the tank 10 through a pair of pipes 24 which lead downwardly from the steam header 25, these pipes 24 being arranged to communicate with the outlet conduit 11, as shown in Fig. 1. The pipes 24 have valves 26 connected therein to control the flow of steam therethrough and each pipe 24 is provided along the side of the tank with a T connection 27 through which communication is established with a tank water pipe 28. The tank water pipes 28 are controlled by valves 29 and they lead downwardly from the water header 30 so that, when it is desired to introduce water into the tank 10, the valves 26 may be closed and the water allowed to flow through the valves 29 and thence through the lower portions of the pipes 24 into the conduit 11 at the bottom of the tank. In this way a suitable supply of water is available for securing and maintaining the desired level of water in the tank and live steam may be introduced through the pipes 24 for the purpose of heating the contents of the tank and rendering the lard therefrom.

As illustrated in Fig. 2, the contents of the tank 10 includes a body 31 of water and residue located at the bottom of the tank and a layer 32 of the rendered lard which floats on top of the water mixture. This illustrates the condition after the lard has been rendered and after the water and residue have been allowed to setle out of the lard, so that conditions are suitable for the withdrawing of the rendered product. The lard is drawn off from the surface of the layer 32 through a draw-off conduit 33 which includes the draw-off pipe 33ª mounted in the wall of the tank 10 somewhat below the upper surface of the water layer 31. This pipe has a valve 34 connected therein for controlling the outflow and the inner end of the pipe is connected to the flexible metal conduit 33ᵇ. The upper end of the draw-off conduit 33 is carried by a float 35 constructed, preferably, as a seamless copper hollow ball or sphere having sufficient strength, in the preferred construction, to stand a pressure of 100 pounds per square inch. The lower side of the float 35 is connected by a member 36 with a coupling 37 to which the upper end of the flexible conduit 33ᵇ is connected. The connector 37 has side branches 37ª in which are mounted the curved inlet pipes 38, the upper ends of which extend vertically and open within the wire mesh screens 39 which are U-shaped in horizontal cross-section, having their edges attached to the sides of the float 35 so that they form small screened chambers around the upper ends of the pipes 38 to protect the inlets of these pipes from any floating particles of residue which may be on the surface or within the body of the lard layer 32. The upper side of the float 35 has a ring 40 attached thereto and this ring is connected with a flexible supporting member 41 arranged to pass through an eyelet 42 attached to the top wall 10ᶜ of the tank. A hook 43 is provided in the head 15 and the flexible supporting member 41 is knotted at 41ª and is provided with a loop 41ᵇ at its extremity so that when the knotted portion 41ª is in engagement with the hook 43, the float 35 will be elevated out of contact with the materials in the tank and will be held suspended beneath the overhanging top wall 10ᶜ so that it will be protected from the materials being introduced into the tank through the top opening 16. When the operator wishes to draw off the lard after the rendering has been completed and the settling step of the process carried on sufficiently, the knotted portion 41ª of the flexible supporting member may be disengaged from the hook 43, thereby permitting the float 35 to lower until it is supported on the top surface of the lard layer.

In the practice of the invention, the tank 10 is first partially filled with clear water which is introduced through the pipes 24 and the pipes 28, leaving the valves 26 closed so that the flow of steam is cut off. The gate valve 12 is closed at this time so that the contents of the tank will not be permitted to flow out and after a suitable quantity of water has been introduced into the tank, the tank is then filled to the desired level with killing fat or cutting fat or both, which materials are introduced through the top opening 16 after removing the cover plate 17. During this filling process the float 35 is suspended in proximity to the top wall 10ᶜ by raising the supporting member 41, and when the tank has been suitably filled, the cover plate 17 is tightly closed and the valve 21 in the blow-off pipe 20 is closed, so that a closed chamber is provided within the tank for carrying on the rendering process. The relative proportions of water and raw fat may vary depending upon the character of the materials being rendered, but we have found that a proportion of about 4,000 pounds of water to 18,000 pounds of raw fat is ordinarily a suitable relative proportion for satisfactory rendering. Having closed the valves 29 in the water supply pipes, the valves 26 in the steam pipes are then open and live steam is introduced into the bottom of the tank at a pressure, preferably of about 40 pounds per square inch in the live steam line, which results in the heating of the contents of the tank to a temperature of about 286 degrees Fahrenheit, at which temperature the materials are maintained during the rendering process. It has been found that this temperature results in the most rapid rendering which is consistent with the prevention of the discoloration of the fat. The cooking or rendering step of the process is continued for about nine hours under this steam pressure and temperature, at which time, upon inspection, it will usually be found that the contents of the tank has been suitably rendered. The steam is then shut off and the pressure within the tank is gradually released by opening the valve 21 in the flow-off pipe 20. At the end of forty-five minutes or an hour, the pressure within the tank will have been sufficiently reduced to permit the taking off of the head or cover 17. A quantity of salt is then added as a catalyst to assist in effecting the settlement of the water globules from the fat in the tank. With the relative proportions of materials above indicated, about 40 pounds of salt should be added. The next step of the process consists in allowing the contents of the tank to rest and settle, which settling step is continued for a period of about two hours, at the end of which time the rendered lard will have risen to the top of the liquid body, substantially as represented in Fig. 2 of the drawings. The float 35 is then lowered and allowed to rest on the surface of the lard and, upon opening the valve 34, the rendered lard is permitted to flow off into suitable vessels where it is stored and cooled. The drawing off process in connection with a tank of the capacity heretofore referred to will usually occupy a period of about two hours.

During the process of drawing off the lard, it is taken continuously from the surface of the lard layer 32 and those portions of the lard layer which are most free of water and particles of residue are withdrawn first, so that the best grades of lard are ordinarily obtained during the first part of the drawing off process. Due to the fact that the lard is drawn continuously from the surface, it is possible to begin the drawing off process at an earlier stage than has been possible in the former rendering processes above referred to, so that the best grade of lard from the top surface of the layer is taken off before it has been allowed to settle for a sufficient length of time to effect the discoloration thereof and, consequently, the desirable greenish color in the lard is maintained in the finished product after drawing off. As the drawing off process continues, the float lowers on the surface of the lard and the drawing may be continued until substantially all of the lard has been drawn off down to the surface of the water, without danger of intermingling particles of water with the lard and, at the same time, the different grades of lard are separated from each other instead of being intermingled. Not only is there a saving in the necessary time of settling because of the possibility of starting the drawing off process at an earlier stage in the cycle of operations, but this method of drawing off from the surface permits the contents of the tank to be drawn off more rapidly than has been possible with the method of rendering heretofore practiced, so that in the operation of rendering and drawing off a particular batch of materials, a saving of three or four hours of time is effected by the present method. At the same time, there is a saving in equipment because of the lack of any necessity for raising the level of the water in the tank during the drawing off process which has heretofore required a considerable water storage capacity.

Although the invention has been described in connection with the rendering of lard, it will be understood that the principles of the invention may be employed with advantage in the rendering of various fatty products and that the invention may be practiced in various ways within the scope of the appended claim.

I claim:

The combination in rendering apparatus of a normally closed vessel adapted to contain the materials to be rendered under pressure, means for permitting the introduction of said materials into said vessel, means for introducing water and steam into said vessel, a flexible discharge conduit for the rendered products having its outlet below the level of the rendered products in said vessel, a float attached to said conduit and adapted to rest on the upper surface of the rendered products in said vessel, U-shaped screens attached to opposite sides of said float at said surface of said products, and inlet pipes opening within said screens and communicating with said discharge conduit.

HAROLD E. DUDYCHA.